Nov. 29, 1960 D. L. HILEMAN 2,962,663

FREQUENCY DIVIDER CIRCUIT

Filed Oct. 20, 1958

DALE L. HILEMAN
INVENTOR.
BY Allen E. Botney, Agent
Morris Spector,
ATTORNEY

United States Patent Office 2,962,663
Patented Nov. 29, 1960

2,962,663

FREQUENCY DIVIDER CIRCUIT

Dale L. Hileman, Chicago, Ill., assignor, by mesne assignments, to Thompson Ramo Wooldridge Inc., Cleveland, Ohio, a corporation of Ohio Filed Oct. 20, 1958, Ser. No. 768,421
7 Claims. (Cl. 328—39)

Figure 1:
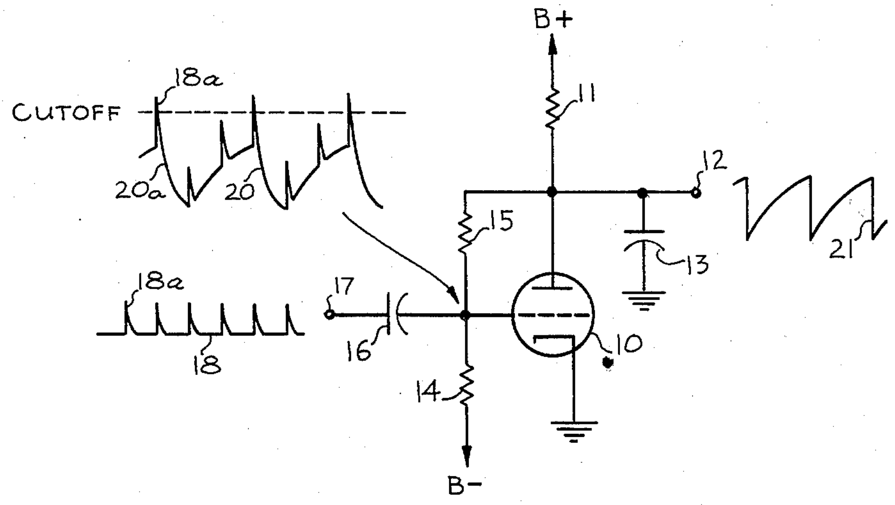

The present invention relates in general to frequency divider circuits and more particularly to a very simple and stable relaxation type of frequency divider circuit that produces submultiple frequencies over a broad range.

Frequency division has many important practical applications throughout the electronics field, as, for example, in the computer and communications fields. Accordingly, numerous efforts have been made to develop circuits which would satisfactorily perform that function. The present invention provides a relaxation type of frequency divider circuit that is superior to circuits of this type found in the prior art in that it is quite stable and far simpler than any such circuit heretofore developed and, moreover, operates satisfactorily over a broader frequency band.

Frequency divider circuits of the relaxation type may be found in the prior art. One of the disadvantages of these prior circuits is that the technique of plate-cutoff rather than grid-cutoff is employed, which necessitates the use of vapor or gas tubes in order to obtain an appropriate plate-cutoff characteristic. It is well known that gas tubes are generally more expensive and noisier than vacuum tubes and the noise aspect, it will be recognized, is important where noise-free conditions are desired. A further disadvantage of the earlier relaxation type of frequency divider circuit is that only one charging and discharging circiut is provided therein or, stated differently, only one resistance-capacitance control circuit is provided, and, in view of the fact that the time constant of such a control circuit may be varied only to a limited extent while still retaining stable divider circuit operation, frequency division is possible only over a relatively narrow range of frequencies.

Examples of prior art frequency divider circuits of the types mentioned above may be found in U.S. Patent 2,221,665, entitled "Periodic Wave Generator," invented by John C. Wilson, issued November 12, 1940, and U.S. Patent 2,585,722, entitled "Frequency Divider," invented by Jack A. Baird, issued February 12, 1952.

It is, therefore, an object of the present invention to provide a frequency divider circuit of the relaxation type that is simply constructed and stable in its operation over a relatively broad range of frequencies.

It is another object of the present invention to provide a relaxation type of frequency divider cricuit that employs the technique of grid-cutoff.

It is a further object of the present invention to provide a relaxation type of frequency divider circuit whose stability and range of operation are extended by utilizing a pair of charging and discharging circuits therein.

The above and other disadvantages associated with frequency divider circuits of the relaxation type encountered in the prior art are overcome in a preferred embodiment of the invention by providing impedance coupling between the plate and grid circuits of the tube used in the divider circuit embodying the present invention. As a result of this coupling feature, the voltages developed in the charging and discharging plate circuit are fed back to the charging and discharging grid circuit so that the divider circuit operation is affected by variations of the charging and discharging rates in either of the plate or grid circuits. In this manner, a broader band of stable operation is obtained.

More specifically, the circuit of one embodiment of the present invention utilizes a triode tube with associated resistor and capacitor elements. One capacitor, $C_1$, is connected across the triode, that is, between the triode plate and ground, while another capacitor, $C_2$, is connected between the control grid and the divider circuit input. Both capacitors are instrumental, according to their individual rates of charge and discharge, in controlling the submultiple of frequency obtained.

In particular, the triode is normally biased below cutoff and, hence, is non-conducting. Capacitor $C_1$ is initially charged and when a pulse is applied to the tube grid, the tube conducts thereby discharging capacitor $C_1$ through it. The capacitor discharge causes the plate voltage to drop and, in turn, this voltage drop is translated to the grid through a voltage divider which includes the several resistors $R_1$, $R_2$ and $R_3$. Consequently, the grid bias is dropped materially below the cutoff value of the tube.

Following discharge, capacitor $C_1$ again charges, the plate voltage thereby rising exponentially according to the time constant $C_1R_1$. The rise in plate voltage causes capacitor $C_2$ to also charge in an exponential manner with the result that the grid voltage similarly increases, at a rate, however, affected by $R_2$ and $R_3$. This rate of grid voltage rise is made small enough or, stated differently, the time constant involved is made large enough so that one or more input pulses appear on the grid before the cutoff voltage is exceeded and the tube conducts again.

The circuit gives effective frequency division in square wave and "spike" pulse inputs. By proper choice of tube operating characteristics and circuit elements, frequency division by a factor of two or more may be achieved over a wide range of frequencies.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only and is not intended as a definition of the limits of the invetnion.

Figure 2:
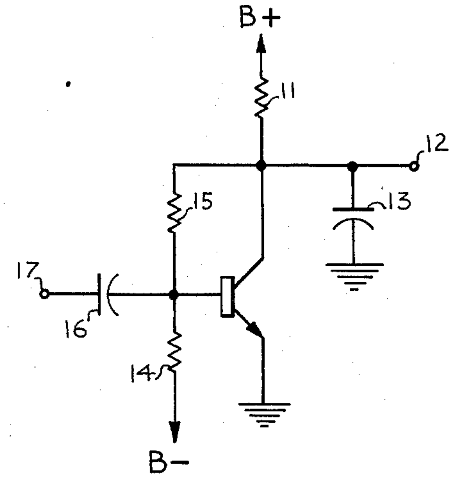

Fig. 1 shows one embodiment of a voltage divider circuit according to the present invention; and Fig. 2 shows another embodiment of a voltage divider circuit according to the present invention.

Referring now to the drawings, there is shown in Fig. 1 a simple and stable frequency divider circiut according to the present invention which, in response to pulses applied thereto at a first frequency or rate, produces output pulses at a lower rate. As shown, the circuit comprises a vacuum tube 10 which is preferably a triode, the tube cathode being connected directly to ground and the plate thereof being connected through a plate load resistor 11 to a source of positive voltage designated B+. The plate element is also connected to an output terminal 12 whereat the output pulses are produced. In addition, a capacitor 13 is connected between the plate and ground. As will be seen later, resistor 11 and capacitor 13 constitute a charging circuit and capacitor 13 and tube 10 constitute a discharging circuit.

The control grid of triode 10 is connected firstly through a resistor 14 to a source of negative voltage designated B— and secondly is connected through a resistor 15 to the triode plate. It will be obvious from the circuit shown that resistors 11, 14 and 15 constitute a voltage divider in which the values of resistance are so selected that tube 10 is biased below cutoff, which means that the tube is normally non-conducting. Finally, the control grid of tube 10 is coupled through a capacitor 16 to an input terminal 17 at which the original pulses are applied. As before, it will be seen that resistor 15 and capacitor 16 constitute a charging circuit whereas capacitor 16 and resistor 14 constitute a discharging circuit.

In considering the operation, it should first be mentioned that the pulse train applied to input terminal 17 is represented by the wave form designated 18, that the voltage variations appearing at the control grid of tube 10 is represented by the wave form designated 20 and that the signal produced at output terminal 12 is represented by the wave form designated 21. It should also be reiterated that tube 10 is normally biased below cutoff, by an amount that is less than the amplitude of the pulses. Stated differently, the extent of the bias is such that a pulse of pulse train 18 will, during quiescent operation of the tube, bring the bias of the tube above cutoff and thereby render it current conducting. Furthermore, in view of the fact that tube 10 is initially non-conducting, capacitor 13 is initially charged, with the result that the voltage across capacitor 13 is initially equal to the voltage between the tube plate and ground.

Accordingly, when a pulse of pulse train 18, such as pulse 18*a*, is applied to input terminal 17, this pulse is coupled through capacitor 16 and is applied to the control grid of tube 10. In consequence thereof, current commences to flow through vacuum tube 10. As a result of the introduction of current flow through tube 10, it will be quite obvious to those skilled in the art that capacitor 13 will discharge through the tube, thereby causing the plate voltage to suddenly and materially drop in value. In turn, the plate voltage drop is translated through resistors 14 and 15 to the control grid, thereby dropping the grid voltage well below the cutoff value, as shown by curve 20*a* in wave form 20. Consequently, tube 10 cuts off once again, the cutoff taking place well before the next input pulse appears on the grid. However, the time constant of the discharge path of capacitor 16, that is, the time constant of resistor 14 and capacitor 16, is made sufficiently long so that cutoff of tube 10 does not occur until capacitor 13 has completely discharged through the tube 10.

Once tube 10 is rendered non-conducting in response to an applied pulse, capacitor 13 again charges at a rate determined by the value of voltage B+ and the time constant of capacitor 13 and resistor 11. The exponential rise in plate voltage causes the grid voltage to also rise but its exponential rate of increase is affected not only by the aforementioned time constant of capacitor 13 and resistor 11, but also the time constant of capacitor 16 and resistor 15. These time constants are adjusted to be large enough so that one or more pulses of pulse train 18 appear on the grid before the cutoff voltage is exceeded and the tube conducts again, as is clearly shown by wave form 20 in the figure. The operation delineated above is repeated when an applied pulse causes tube 10 to conduct once again.

In response to the periodic firing and cutting off of tube 10, a sawtooth type of voltage pattern is produced at output terminal 12 and, because some of the pulses of pulse train 18 are permitted to ride on the grid voltage without effect between firing of tube 10, the pulse repetition frequency of the signal produced at output terminal 12 is a sub-multiple of the pulse repetition frequency of pulse train 18. It will readily be recognized that the sub-multiple frequency of signal 21 is determined by the time constants associated with capacitors 13 and 16. By proper choice of circuit elements affecting either one or both of these time constants, frequency division by two or three may be achieved over a wide range of frequencies.

It should be mentioned that other ways are available for biasing tube 10 than as shown in the figure and heretofore described. One way, for example, is to connect resistor 14 to ground rather than to a source of negative voltage and, additionally, connect the cathode of tube 10 to a source of positive voltage rather than to ground. It should also be mentioned that devices other than vacuum tube 10 but equivalent to it may be used in the divider circuit. One such device, for example, is the junction transistor wherein the collector, base and emitter correspond to the plate, grid and cathode, respectively, of the tube. Either the N–P–N– or P–N–P type may be used, the circuit shown in Fig. 2 illustrating the use of the N–P–N tpye.

If the N–P–N– type of junction transistor is used in place of the tube, the polarities of the voltages and signals applied will remain the same so that the transistor need only be inserted in the circuit. On the other hand, if the P–N–P type of junction transistor is used, the polarities of the applied voltages and signals must be reversed in addition to the substitution of the transistor for the tube. Thus, referring to the figure, resistor 11 would, in such an instance, be connected to a source of negative voltage, resistor 14 connected to a source of positive voltage and the pulses of pulse train 18 would be negative.

Finally, it should be noted that although the divider circuit of the present invention is preferably operated with tube 10 initially biased below cutoff, the circuit may also be operated equally as well with tube 10 initially biased above cutoff and conducting current. Where the tube is operated in this manner, it will be apparent that capacitor 13 will charge less than previously but that otherwise the circuit will function as described above. Thus, under these circumstances, the application of pulse 18*a* will cause tube 10 to conduct even more current thereby again discharging capacitor 13 and lowering the plate voltage. This reduction of plate voltage is translated to the control grid with the result that here again the tube is biased below cutoff. At this point, capacitors 13 and 16 again charge at a rate to produce frequency division.

Having thus described the invention, what is claimed as new is:

1. A frequency divider circuit for producing an output train of pulses having a pulse repetition frequency that is a submultiple of the pulse repetition frequency of an applied train of pulses, said circuit comprising: an input capacitor receptive of the applied train of pulses; an output capacitor across which the output train of pulses is produced; first and second charging circuits for said input and output capacitors, respectively; first and second discharging circuits for said input and output capacitors, respectively; and switch means forming a part of said second discharging circuit, said switch means being coupled to said input and output capacitors in such a manner as to be responsive to the voltages thereon and to applied pulses selected in accordance with the time constants of said charging and discharging circuits to periodically and alternately charge and discharge said input and output capacitors.

2. A frequency divider circuit for producing an output train of pulses having a pulse repetition frequency that is a submultiple of the pulse repetition frequency of an applied train of pulses, said circuit comprising: a triode vacuum tube; an input capacitor connected to the control grid of said tube for coupling the applied train of pulses thereto; an output capacitor for producing the output train of pulses thereacross connected in shunt with said tube; and a voltage divider circuit including first, second and third resistors, said first and third resistors being connected to the plate and control grid, respectively, and said second resistor being connected between the plate and control grid, the values of resistance of said first, second and third resistors being chosen in such a manner that the voltages thereacross bias said tube beyond cutoff by an amount less than the amplitude of selected applied pulses, the pulses being selected in accordance with the voltages of said input and output capacitors.

3. A frequency divider circuit for producing an output train of pulses having a pulse repetition frequency that is a submultiple of the pulse repetition frequency of an applied train of pulses, said circuit comprising: first and second capacitance means; charging and discharging circuits for each of said first and second capacitance means, the discharge time of the discharging circuit of said second capacitance means being longer than that of the discharging circuit of said first capacitance means and the charge time of the charging circuit of said second capacitance means being shorter than that of the charging circuit of said first capacitance means; and control means dependent at least in part upon the voltages of said first and second capacitance means for controlling each of said circuits to periodically and alternately charge and discharge said first and second capacitance means, the charge time of the charging circuit of said first capacitance means being sufficiently long such that the voltage of said first capacitance means periodically prevents said control means from discharging said first capacitance means until a predetermined number of pulses have been applied.

4. A frequency divider circuit for producing an output train of pulses having a pulse repetition frequency that is a submultiple of the pulse repetition frequency of an applied train of pulses, said circuit comprising: a voltage divider circuit including first, second and third resistors; a first capacitor connected to said second and third resistors at the junction thereof and receptive of the applied train of pulses, said second resistor and capacitor forming a first charging circuit; a second capacitor connected to said first and second resistors at the junction thereof and across which the output train of pulses is produced, said first resistor and second capacitor forming a second charging circuit; and switch means coupled between said first and second capacitors, said switch means being operable in response to the voltages of said first and second capacitors and to selected pulses of the applied train of pulses to periodically discharge said second capacitor through said switch means of said first capacitor through said third resistors, the selected pulses being determined in accordance with the time constants of said first and second charging circuits.

5. A frequency divider circuit for producing an output train of pulses having a pulse repetition frequency that is a submultiple of the pulse repetition frequency of an applied train of pulses, said circuit comprising: a charging circuit including a first resistor and capacitor connected in series, the output train of pulses being produced across said first capacitor; a second resistor and capacitor connected in series, said second capacitor being receptive of the applied train of pulses; impedance means connected between said first and second capacitors for feeding back to said second capacitor a portion of the voltage variation of said first capacitor; and switch means coupled between said first and second capacitors and operable in response to the voltages of said first and second capacitors and selected applied pulses to periodically discharge said first capacitor through said switch means, the selected applied pulses being determined by the voltage variations of said second capacitor.

6. The frequency divider circuit defined in claim 5 wherein said impedance means includes a resistor.

7. A frequency divider circuit adapted to be fired by selected pulses of an applied periodic-pulse wave, said circuit comprising: first and second capacitors, said second capacitor being receptive of the periodic-pulse wave; first and second charging circuits for said first and second capacitors, respectively; first and second discharging circuits for said first and second capacitors, respectively; and means coupled between said first and second capacitors and forming a part of said first discharging circuit, said means being responsive to the voltages of said first and second capacitors and to the selected pulses for controlling said circuits to periodically and alternatively charge and discharge said first and second capacitors, whereby a train of pulses having a pulse repetition frequency that is a sub-multiple of the pulse repetition frequency of the applied pulse wave is produced across said first capacitor.

References Cited in the file of this patent

UNITED STATES PATENTS

| | | |
|---|---|---|
| 2,230,926 | Bingley | Feb. 4, 1941 |
| 2,496,283 | Gall | Feb. 7, 1950 |
| 2,595,124 | Campbell | Apr. 29, 1952 |
| 2,665,379 | Hadden | Jan. 5, 1954 |
| 2,710,918 | Campbell | June 14, 1955 |

FOREIGN PATENTS

| | | |
|---|---|---|
| 667,619 | Great Britain | Mar. 5, 1952 |